United States Patent Office 3,317,311
Patented May 2, 1967

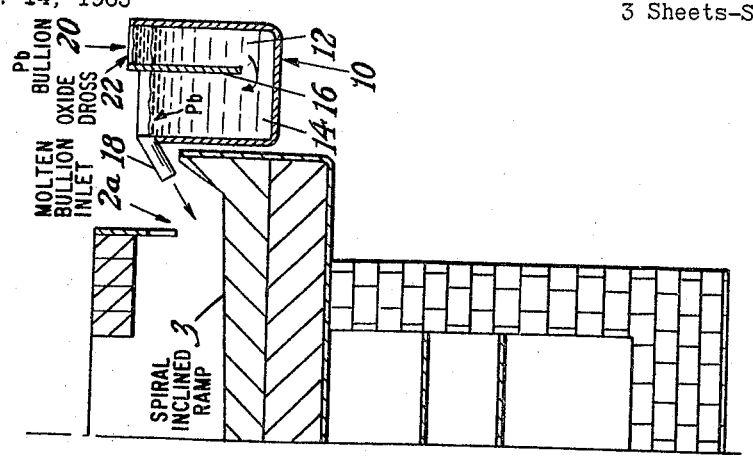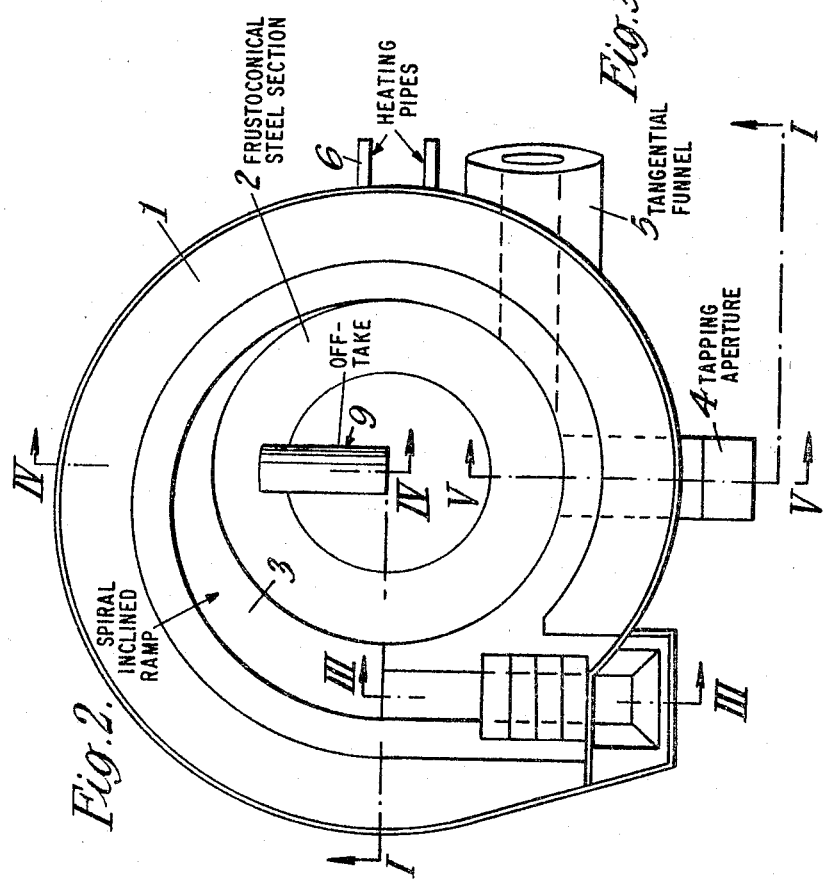

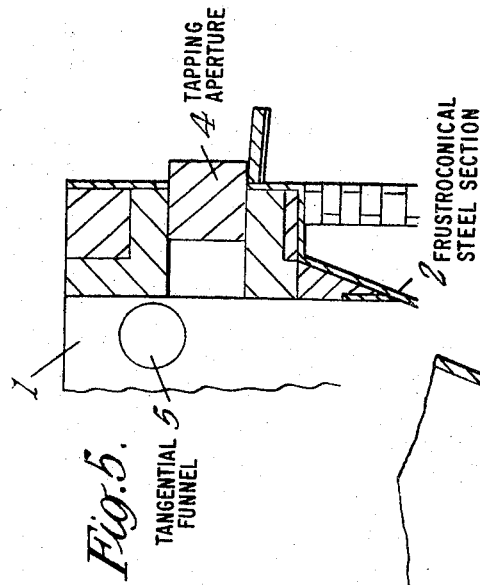
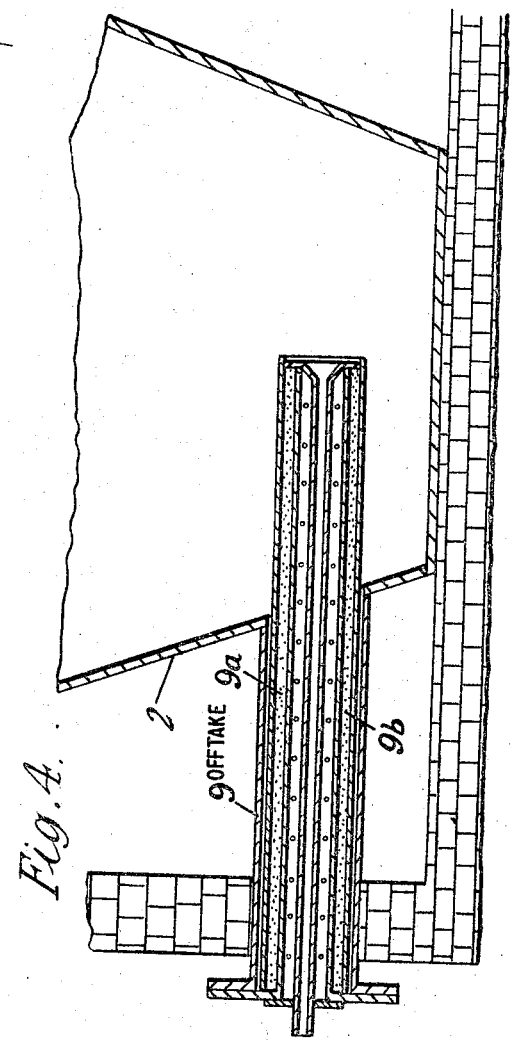

3,317,311
COPPER DROSSING
Thomas Ronald Albert Davey, Avonmouth, Bristol, England, assignor to Metallurgical Processes Limited, Nassau, Bahamas, a company incorporated in the Bahamas, and the National Smelting Company Limited, London, England, a British company
Filed Aug. 14, 1963, Ser. No. 302,192
Claims priority, application Great Britain, Oct. 26, 1962, 40,629/62
14 Claims. (Cl. 75—78)

This invention relates to copper drossing.

The known practice for the removal and recovery of copper from lead bullion consists essentially of two distinct and separate processes.

(1) A "drossing" stage where the molten lead is cooled to just above its freezing point in a "kettle" and the crust formed which contains most of the copper plus lead, arsenic, etc., is skimmed off the surface of the metal.

(2) A "smelting" stage in which this crust of "dross" is melted with or without additions such as silica or sulphur, thus freeing much of entrained lead and separating the mass into four main components:

(a) Slag (oxide+silica additions)
(b) Copper matte—mainly sulphides especially copper sulphide
(c) Speiss—mainly arsenic compounds of copper, iron, zinc, etc.
(d) Metallic lead For the purposes of this invention, speiss may be regarded as equivalent to matte as both these float as impurities on the molten lead.

In this way, a copper matte layer which is fairly rich in copper can be recovered and much of the entrained lead is also recovered.

This process is normally carried out batchwise, a batch of some tons of lead bullion being treated at any one time.

This involves the pouring of a large quantity of molten lead into a kettle, for the treatment of each batch and causes the formation of a considerable quantity of lead oxide fume and lead oxide "dross." This can be dangerous to health and also wasteful in lead. Also the process of removing the dross involves arduous manual labour. A further recent development described in Russian Patent No. 120,326 and by Novoselov in Tsvetnye Metalli (1962), No. 5, p. 25, achieves some of the objects of the present invention, but suffers from the disadvantage that the lead cooling is carried out by cooling the walls of the vessel containing the lead, when copper compounds of high melting-point are precipitated and form accretions on the walls of the vessel with subsequent loss of cooling efficiency and eventually the apparatus has to be cleaned out. This also means that the apparatus in which the lead is cooled must not have any constrictions or these are likely to be blocked by accretions.

It is stated by Novoselov (loc. cit.) that "during the decopperizing of lead with a tapping temperature lower than 570° C., accretion formation is inevitable."

The present invention avoids the above disadvantages in that the process is carried out continuously, with addition of lead bullion to the purification apparatus in batches but with continuous removal of the purified lead and without the arduous manual removal of dross.

The invention consists in a method of copper drossing of lead bullion comprising; feeding the lead bullion into a vessel with an upper portion maintained at a high enough temperature to prevent any accretions forming on the inside of its walls and a lower portion which is drastically cooled to form banks consisting of a matrix of solid lead containing precipitated particles of impurities such as copper, or copper sulphides and arsenides; drawing off relatively cold drossed lead from the bottom of the vessel; from time to time interrupting the cooling, and melting off the said banks, so that copper-containing particles float to the top of the lead in the vessel and dissolve in a matte layer; and tapping off this molten matte layer at intervals.

Drastic cooling may be effected by direct spraying of water upon the outer surface of the lower portion of the vessel.

A further preferred feature of the invention is that the oxides that are always present in lead bullion are removed before the lead is charged to the vessel.

This separation of oxides can be effected by means of a ladle divided into a large and small portion with an underflow baffle whereby the floating oxide dross is retained in the small portion while the lead bullion flowing beneath the baffle, passes on; provided that this separation is effected at a temperature above that at which sulphide dross starts to separate from solution in the lead, the separated oxide dross is nearly free from copper. With this oxide dross separated, it is necessary to maintain the upper portion of the vessel in which the copper drossing is carried out at a temperature (about 800° C.) sufficiently high to maintain the matte, and any speiss formed, in a fluid condition. If oxides are allowed to enter the copper-drossing vessel, the upper portion of the vessel must be maintained at a higher temperature (e.g. 1100° C. to 1200° C.) in order to form a molten slag from the oxides.

Sulphur can be added to the bullion in the furnace used to produce it to adjust its composition so that the matte resulting has a low melting point (below 800° C.).

The preferred form of sulphur is elemental sulphur, and the preferred method of adding it is to infuse it below the surface of the lead coming from the furnace. The use of lead-sulphides or iron-pyrites concentrates is disadvantageous, since these would introduce oxides from the gangue materials into the concentrates but they may be used if of such high purity that the contained slag-forming constituents (oxides) are not present in excess of the amount that will dissolve in the matte layer.

Preferably, the lead bullion is caused to flow into the vessel round a spiral ramp to minimize the disturbance of the lead in the lower portion of the vessel.

The cold drossed lead may be removed from the vessel through a needle valve.

The melting off may be achieved by the heat of the downward flowing bullion or the lower part of the vessel may be externally heated for the purpose.

The invention further consists in a vessel for copper dressing comprising: an upper lagged and lined cylindrical section having a spiral ramp for feeding in lead bullion, a lower frustoconical section having heating means around its upper portion and means for drastically cooling (e.g. means for spraying water on to) its lower portion, and means for withdrawing liquid lead at the bottom thereof.

Preferably, the lower frustoconical section is unlined and unlagged for two-thirds of its height and water is periodically sprayed on to the bare walls of the lower portion in order to cool it drastically.

Conveniently in matte-tapping orifice and also a tangential aperture for a burner is provided in the upper cylindrical section.

There will be large fluctuations in the top level of lead in the vessel. As the upper, refractory-lined section of the furnace will be liable to unavoidable heat losses, not being heated, this is the most likely place for accretion formation. This accretion formation can be avoided by making use of the rise and fall of the furnace level. This rise and fall will cause the refractory to be at some time exposed to the burner flame and thus make possible the smelting off of any accretion.

The invention will be further described with reference to the accompanying drawings.

FIGURE 2 is a sectional plan on the line II—II of FIGURE 1.

FIGURE 3 is a detail of a section on the line III—III of FIGURE 2.

FIGURE 4 is a section on the line IV—IV of FIGURE 2.

FIGURE 5 is a detail of a section on the line V—V of FIGURE 2.

Figure 1:
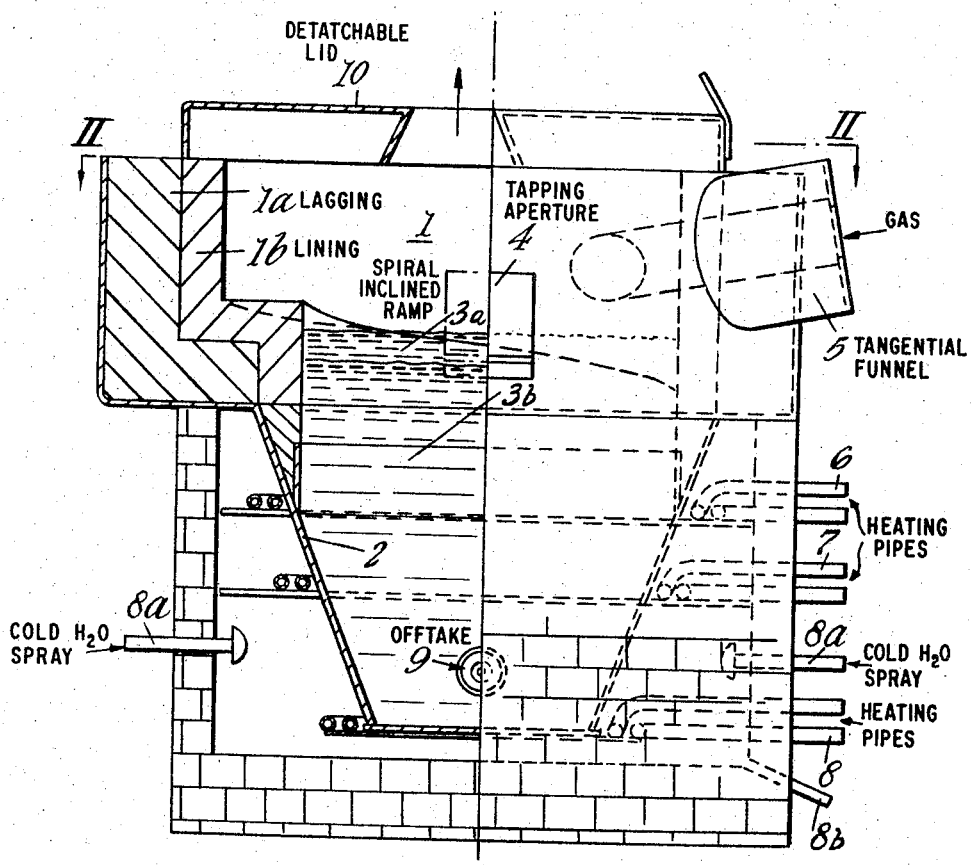
FIGURE 1 is a vertical section on the line I—I of FIGURE 2.

The drawings show a vessel comprising a top cylindrical section 1 with lagging 1a and lined with chrome-magnesite lining 1b and a bottom unlagged inverted frustoconical steel section 2.

The top section has a spiral inclined ramp 3, with a feed inlet 2a in its side wall, a molten matte layer 3a and a column of molten lead bullion 3b, a tapping aperture 4 and a tangentially arranged funnel 5 for a gas burner.

The section 2 has heating pipes 6, 7 and 8 for introducing gas and air at three levels. The heating pipe 8 is used only occasionally. In the lower part of section 2 are provided water sprays 8a for spraying water directly onto the unlined steel shell to periodically drastic cooling.

An offtake 9 is provided let into the section 2 near the bottom and penetrating to the centre of the section. It is in the form of tube with a powered magnesia or other thermally insulating filling 9a and an electrical heating tape 9b providing about 1 kw. power.

A detachable lid 10 is placed on top of the section 1.

This section is insulated and all the metal is therefore in a molten state. The metal which descends into the lower section of the furnace comes into contact with the drastically cooled walls and as a result a bank of discrete dross particles in a matrix of lead is formed on these walls. When this bank has been allowed to build up, the cooling of the lower walls is temporarily stopped and these walls are heated (either by external heating or preferably by the heat supplied by the incoming bullion) so as to melt the bank, when the dross particles float upwards to the surface of the molten lead where they dissolve in the molten matte layers which is intermittently tapped off. The cooled, drossed lead is continuously removed from the bottom section of the furnace through the offtake point 9 via a needle valve specially designed for this purpose. Any accretions formed on the top walls of the furnace are smelted off by means of the tangentially applied gas burner 5 throwing a reducing flame (a diffusing of oxygen).

As pointed out above, it is preferred to remove oxides present in the bullion before the molten lead is charged to the apparatus. In accordance with the suggestion made, this is advantageously in the form a vessel 10 divided into communicating compartments 12 and 14 by means of a partition or underflow baffle 16; the second compartment having an underflow lip or spout 18 for direct communication with feed inlet 2a. Molten lead bullion 20 is fed into compartment 12. The oxide floats on the top of the molten lead bullion as a layer 22 in compartment 12, from which it is removed from time to time.

Various modifications may be made within the scope of the invention.

I claim:

1. In the method of copper-drossing molten lead bullion in a confined relatively deep upright treating zone, the improvement in combination therewith which comprises:

(a) feeding molten lead bullion gently into the upper portion of the treating zone to form an upright column of the molten bullion and to minimize disturbance of the molten lead bullion in the lower portion of the column;

(b) heating the upper portion of the column of molten lead bullion to a temperature high enough to prevent accretions thereof from forming at the periphery of that portion of the treating zone;

(c) drastically cooling the lower portion of the column of molten lead bullion to form accretion banks of a matrix of solid lead containing precipitated particles of impurities, such as copper, copper sulphides and copper arsenides, at the periphery of that portion of the treating zone;

(d) interrupting the cooling of the lower portion of the column of molten lead bullion from time to time and then re-heating the same to increase its temperature high enough to melt said accretion banks.

(e) permitting resulting copper-containing particles from the accretion banks to float to the top of the column of molten lead bullion;

(f) dissolving the copper-containing particles in a molten matte layer collecting on the top of the column of molten lead bullion;

(g) tapping off molten matte from the resulting layer; and (h) drawing off relatively cool copper-drossed molten lead from the lower portion of the column of molten lead bullion.

2. Method according to claim 1, which dross initially present in the molten lead bullion is removed before the molten lead bullion is fed into the upper portion of the treating zone.

3. Method according to claim 1, in which the molten lead bullion is fed in the form of a relatively narrow stream spiraling down the peripheral portion of the treating zone to minimize disturbance of the molten lead bullion in the lower portion of the column.

4. Method according to claim 1, in which the molten lead bullion is passed through a vertically flexible confined space in the upper portion of the upper section of the treating chamber; hot gases are passed through the confined space to heat simultaneously molten lead bullion passing therethrough and the molten matte layer on the top of the column of molten lead bullion.

5. Method according to claim 1, in which a matte melting point lowering agent is added specially to the molten lead bullion in a form and in an amount to lower substantially the melting point of the layer of molten matte on the top of the column, said agent being selected from the group consisting of sulphur, elemental sulphur, lead sulphide and iron sulphide.

6. Method according to claim 1, in which the molten lead bullion is passed through a vertically flexible confined space in the upper portion of the upper section of the treating chamber; hot gases are passed through the confined space to heat simultaneously molten lead bullion passing therethrough and the molten matte layer on the top of the column of molten lead bullion; and the level of the molten lead bullion in the column is permitted to rise and fall so that accretions formed at the periphery of the upper section of the treating zone will be brought into direct contact with said hot gases to smelt away the same.

7. Method according to claim 1, in which the lower portion of the column of molten lead bullion is drastically cooled with water applied exteriorly to that portion of the treatment zone.

8. Method according to claim 1, in which the cooled lower portion of the column of molten lead bullion is re-heated by permitting on-coming hot molten lead bullion from the heated upper portion of the column to merge therewith.

9. In apparatus having a confined relatively deep upright treating chamber for the copper-drossing of molten lead bullion, the improvement in combination therewith comprising:

(a) the upper section of the treating chamber is insulated to inhibit the loss of heat therethrough;

(b) the lower section of the treating chamber consists of an un-insulated metal shell to facilitate the loss of heat therethrough;

(c) the top of the treating chamber is surmounted by a removable top having an outlet for the escape of spent heating gases;

(d) the removable top is spaced suitably from the normal level of molten matte and molten lead bullion maintained in the apparatus for treatment to provide a vertically flexible confined space;

(e) a molten-lead-bullion feed inlet communicates with the upper portion of the upper section of the treating chamber;

(f) merging means connect the discharge end of the feed inlet for causing in-coming molten lead bullion gently to contact and merge with the top portion of the column of molten lead to minimize turbulence thereof;

(g) a tapping conduit extends through the side wall of the upper section of the treating chamber for the discharge of molten matte therefrom; and the tapping conduit extends somewhat above and below the molten matte level normally maintained in the upper section of the apparatus to accommodate a rise and fall of that matte level;

(h) a gas-firing-inlet extends through the wall of the upper portion of the upper section of the treating chamber well above the normal level of molten matte and molten lead bullion maintained in the apparatus;

(i) cooling means are provided at the lower section of the treating chamber to cool the same drastically; and (j) a copper-drossed-molten-lead outlet extends through the lower part of the treating chamber for the withdrawal of copper-drossed molten lead.

10. Apparatus according to claim 9, in which said feed inlet includes an insulated feed trough into which molten lead bullion is fed for passage to said merging means, said trough having a partition extending across the trough and extending from the top of the treating chamber into but not in contact with the bottom of the trough so that molten bullion can flow thereunder.

11. Apparatus according to claim 9, in which the molten-lead-bullion merging means is in the form of a downwardly inclined relatively narrow spiral ramp extending peripherally around at least a portion of the upper section of the treating chamber over which a stream of the molten lead bullion may be passed and merged gently with the upper portion of the column of molten lead bullion normally maintained in the treating member.

12. Apparatus according to claim 9, in which the gas-firing-inlet extends tangentially through the wall of the upper portion of the upper section of the treating chamber well above the normal level of molten matte and molten lead bullion so that hot gases passed therethrough may spiral freely around the upper portion of the upper section of the treating chamber.

13. Apparatus according to claim 9, in which the uninsulated metal shell is provided with means for heating the same.

14. Apparatus according to claim 9, in which the uninsulated metal shell is provided exteriorly with a plurality of spaced cold water spray nozzles for drastically cooling the same.

References Cited by the Examiner

UNITED STATES PATENTS

| | | | |
|---|---|---|---|
| 207,938 | 9/1878 | Balbach | 75—79 |
| 1,425,701 | 8/1922 | Sem | 75—93 X |
| 1,687,187 | 10/1928 | Williams. | |
| 1,687,188 | 10/1928 | Williams | 75—79 |
| 1,774,688 | 9/1930 | Williams | 75—79 |

OTHER REFERENCES

Novoselov et al., Tsuetyne Metalli, 1962, No. 5. (Translation filed in file wrapper of application.)

Perry et al., Chemical Engineer's Handbook, 3rd edition, page 1688, McGraw-Hill, 1950.

HYLAND BIZOT, *Primary Examiner.*

DAVID L. RECK, *Examiner.*

H. W. TARRING, *Assistant Examiner.*